United States Patent Office 2,714,606
Patented Aug. 2, 1955

2,714,606

PROCESS FOR THE PRODUCTION OF NITROUS ESTERS

Samuel Soloveichik, New York, N. Y.

No Drawing. Application June 21, 1954,
Serial No. 438,325

3 Claims. (Cl. 260—466)

This invention relates to the production of nitrous esters of the formula R—O—N—O (where R represents an alkyl radical) by the action of nitric acid on an alcohol, in presence of boric anhydride.

When an alcohol is heated with nitric acid, a well known reaction takes place which results in the formation of a nitric ester and water.

I have found out that in the presence of boric anhydride, nitric acid is decomposed to give with an alcohol the corresponding nitrous ester, instead of the corresponding nitric ester.

In accordance with the invention, a nitrous ester is obtained by adding boric anhydride to an alcohol, heating and agitating the mixture and adding, gradually, the nitric acid. The nitrous ester, being always more volatile than the corresponding alcohol, is distilled off as soon as it is formed.

The method is illustrated by the following examples:

Example A 88 grams of isoamyl alcohol, 26 grams of boric anhydride and a small quantity of nitric acid are heated in a flask, which is equipped for simultaneous distillation, agitation and gradual addition of nitric acid from a dropping funnel, until the reaction starts (which usually occurs at a bath temperature of 123–6° C.). The heating bath is, then, removed, the reaction mixture is agitated, and 90 grams of 70% nitric acid are, gradually, added. The rate of addition of nitric acid is, approximately, the same as the rate at which the distillate comes off through the Liebig condenser which is attached to the flask. Once the reaction starts, no further heating is necessary as the reaction continues and the reaction products distil off without any outside heating. The distillate, after washing, drying and redistilling it, yielded 62 grams of isoamyl nitrite.

Example B 74 grams of butyl alcohol, 26 grams of boric anhydride and 8 grams of 70% nitric acid were heated in a flask, described in Example A, which could be either a three-necked flask or a Claisen flask equipped with a mercury-sealed stirrer. After the reaction started, the heating bath was removed, the reaction mixture was agitated and 82 grams of 70% nitric acid were, gradually, added. The reaction which took place maintained the temperature in the interior of the flask above the boiling point of butyl nitrite so that the latter came off through the condenser. The reaction was kept under control by regulating the rate of addition of nitric acid. The distillate, washed with a saturated solution of sodium chloride containing sodium bicarbonate, dried with anhydrous magnesium sulfate and redistilled, yielded 54 grams of butyl nitrite. Fractional distillation, after washing and drying the first distillate was, absolutely, necessary in this case as well as in the case described in Example A inasmuch as the first distillate always came off in form of an azeotropic mixture containing impurities which could not be removed, completely, by the washing.

I claim:

1. The method of producing nitrous esters, comprising heating a mixture of an aliphatic alcohol, boric anhydride and nitric acid and distilling off the nitrous ester as soon as it is formed.

2. The method of producing nitrous esters, comprising starting a reaction by heating a mixture of an aliphatic alcohol, boric anhydride and a small quantity of nitric acid, agitating the reaction mixture, adding, gradually, the total quantity of the nitric acid necessary to convert the alcohol into the nitrous ester and distilling off the nitrous ester as soon as it is formed.

3. The method of producing nitrous esters, comprising heating a mixture of an aliphatic alcohol, boric anhydride and a small quantity of nitric acid to a temperature at which the nitric acid decomposes with the resulting formation of the corresponding nitrous ester which as the more volatile component of the reaction mixture distils off, continuing the reaction by adding, gradually, the total quantity of the nitric acid necessary to convert the alcohol into the nitrous ester, washing the distillate which comes off, drying and redistilling it.

References Cited in the file of this patent

FOREIGN PATENTS 133,304     Great Britain _____ Jan. 15, 1920